United States Patent
Becker-Weimann et al.

(10) Patent No.: US 12,331,225 B2
(45) Date of Patent: Jun. 17, 2025

(54) THERMALLY ACCELERATED ADHESIVE COMPOSITIONS BASED ON SILANE-TERMINATED POLYMERS

(71) Applicant: Kleiberit SE & Co. KG, Weingarten/Baden (DE)

(72) Inventors: Klaus Becker-Weimann, Baden-Baden (DE); Patrick Frank, Karlsruhe (DE); Steffen Wunderlich, Heidelberg (DE)

(73) Assignee: KLEIBERIT SE & CO. KG, Weingarten/Baden (DE)

(*) Notice: Subject to any disclaimer, the term of this patent is extended or adjusted under 35 U.S.C. 154(b) by 168 days.

(21) Appl. No.: 18/034,491

(22) PCT Filed: Oct. 29, 2021

(86) PCT No.: PCT/EP2021/080117
§ 371 (c)(1),
(2) Date: Apr. 28, 2023

(87) PCT Pub. No.: WO2022/090462
PCT Pub. Date: May 5, 2022

(65) Prior Publication Data
US 2023/0383155 A1 Nov. 30, 2023

(30) Foreign Application Priority Data
Oct. 30, 2020 (DE) ............ 10 2020 128 608.2

(51) Int. Cl.
| | | |
|---|---|---|
| B29C 65/00 | (2006.01) | |
| C09J 11/06 | (2006.01) | |
| C09J 171/02 | (2006.01) | |
| C09J 183/04 | (2006.01) | |
| B29C 65/48 | (2006.01) | |

(52) U.S. Cl.
CPC ............ C09J 171/02 (2013.01); C09J 11/06 (2013.01); C09J 183/04 (2013.01); *B29C 65/4835* (2013.01)

(58) Field of Classification Search
CPC ................... B29C 65/4835; C09J 171/02
See application file for complete search history.

(56) References Cited

U.S. PATENT DOCUMENTS

| | | | |
|---|---|---|---|
| 5,007,976 A | 4/1991 | Satterfield et al. | |
| 9,102,854 B2 * | 8/2015 | Zhu ............... | C08G 18/12 |
| 2002/0068808 A1 | 6/2002 | Kometani et al. | |
| 2004/0181025 A1 | 9/2004 | Schindler et al. | |
| 2005/0080218 A1 | 4/2005 | Thiele et al. | |
| 2011/0257324 A1 | 10/2011 | Ziche et al. | |
| 2014/0155545 A1 | 6/2014 | Stanjek et al. | |
| 2019/0177541 A1 | 8/2019 | Stanjek et al. | |
| 2019/0315917 A1 | 10/2019 | Stanjek et al. | |

FOREIGN PATENT DOCUMENTS

| | | |
|---|---|---|
| CN | 106367005 A | 2/2017 |
| DE | 601 16 825 T2 | 7/2006 |
| DE | 10 2012 200 790 A1 | 7/2013 |
| DE | 10 2013 213 835 A1 | 1/2015 |
| DE | 10 2016 200 704 A1 | 7/2017 |
| DE | 10 2020 111 278 A1 | 10/2021 |
| EP | 3 475 365 B1 | 8/2019 |
| EP | 3 494 188 B1 | 11/2019 |
| WO | WO 03/014226 A1 | 2/2003 |
| WO | WO 03/051954 A1 | 6/2003 |
| WO | WO 2010/066826 A1 | 6/2010 |
| WO | WO 2013/026654 A1 | 2/2013 |
| WO | WO 2019/004922 A1 | 1/2019 |
| WO | WO 2019/115021 A1 | 6/2019 |

OTHER PUBLICATIONS

DIN EN 13501-1:2019-05 (D), "Fire classification of construction products and building elements—Part 1: Classification using data from reaction to fire test", May 2019, Table of Content.
DIN EN ISO 1716:2018-10 (D), "Reaction to fire tests for products—Determination of the gross heat of combustion (calorific value)", 2018, Table of Content.
International Preliminary Report on Patentability (PCT/IPEA/409), issued in PCT/EP2021/080117, dated Oct. 12, 2022.
International Search Report (PCT/ISA/210), issued in PCT/EP2021/080117, dated Feb. 16, 2022.
Written Opinion of the International Searching Authority (PCT/ISA/237), issued in PCT/EP2021/080117, dated Feb. 16, 2022.

* cited by examiner

*Primary Examiner* — Philip C Tucker
*Assistant Examiner* — Nickolas R Harm
(74) *Attorney, Agent, or Firm* — Birch, Stewart, Kolasch & Birch, LLP

(57) ABSTRACT

The invention relates to a reactive single-component adhesive composition which is liquid at room temperature and which has 3 wt. % to 90 wt. % of at least one alpha-silane-terminated organic polymer, 0 wt. % to 80 wt. % of at least one silicone resin, 0.1 wt. % to 5 wt. % of at least one thermal accelerator, 0.001 wt. % to 5 wt. % of at least one low-molecular silane which has a primary or secondary amino group or a blocked amino group that is hydrogenated in order to form the primary or secondary amino group, and 0 wt. % to 85 wt. % of at least one filler. The invention additionally relates to a method for adhering two substrates using the aforementioned adhesive composition and to a system adhered in such a manner.

18 Claims, No Drawings

THERMALLY ACCELERATED ADHESIVE COMPOSITIONS BASED ON SILANE-TERMINATED POLYMERS

The present invention relates to a reactive one-component adhesive composition which is liquid at room temperature and contains, based on the total weight of the composition, 3 wt % to 90 wt % of at least one alpha-silane-terminated organic polymer, 0 wt % to 80 wt % of at least one silicone resin, 0.1 wt % to 5 wt % of at least one thermal accelerator, 0.001 wt % to 5 wt % of at least one low molecular weight silane which has a primary or secondary amino group or a blocked amino group which hydrolyzes to the primary or secondary amino group, and 0 wt % to 85 wt % of at least one filler. The invention further relates to a method for bonding two substrates by means of this adhesive composition, and to a system thus bonded.

Thermally acceleratable reactive adhesives are used broadly in the industrial sphere in order to meet the requirements of a feeding time, which is often relatively long as a consequence of the process, and of a relatively rapid curing and therefore capacity for further processing (e.g., sawing). Typical fields of usage are the production of insulation panels having outer metal plies. The curing in this case takes place in a heated press, which accelerates the chemical curing. Since in many applications substrates having markedly different expansion coefficients are bonded, the pressing temperature in this case must not be too high to prevent bowing of the assembly. In the area of 2K [two-component] polyurethane adhesives, thermally labile accelerators are used, of the kind available, for example, under the tradename Toyocat® through Tosoh Corporation.

The isocyanate component of these adhesives is based in general on (polymeric) methylenediphenyl diisocyanate (MDI). Working with monomeric MDI has been restricted under REACH in the very recent past, owing to its sensitizing effect, this being evident from the restriction proposals by the European Chemicals Agency.

2K adhesives are generally processed using a mixing and metering unit, in a process in which the specified mixing ratio must consistently be observed. Deviations from the predetermined mixing ratio may entail deficiencies in quality. Typical application techniques are spray application or bead application by means of a coating rake. In the case of spray application, a spray mist is formed which may be released to the environment and must therefore be considered in an occupational hygiene context. In the context of bead application using a coating rake, the reactive mixture may accumulate in the coating rake as time goes on and so cause clogging of the coating rake. This effect is exacerbated in particular if the harmonization between coating rake and adhesive is poor.

Alternatively, moisture-crosslinking 1K [one-component] polyurethane adhesives are used. A disadvantage with this method, however, is that curing is accompanied by formation of $CO_2$ which must be taken off during the pressing procedure. If the pressing time is too short or the moisture content too low, there is a possibility of so-called post-expansion, which can lead to defects and/or to reduced strength in the assembly.

Silane-based hotmelt adhesives are described in the German patent application having the application number 102020111278.5.

A further requirement in the production of panels which are used, for example, in the building, marine or railroad sector, furthermore, is that of fire prevention. An adhesive which is employed in these illustrative sectors and meets class A2 according to DIN EN 13501:2019-05 is required, with reference to an internal, non-substantial constituent of a building product according to EN ISO 1716 (2018-10), to have a maximum calorific value of 4 $MJ/m^2$. Low-flammability polyurethane adhesives with a low calorific value of less than 15 MJ/kg are described for example in WO 03/051954 A1.

A further field of usage in which liquid reactive adhesives are subject to a thermal curing process is the production of automotive roof linings or the production of panels. U.S. Pat. No. 5,007,976 A describes a method wherein a sandwich composite consisting of foam core, glass fiber and fabric outer ply is pressed at temperatures of more than 90° C. by means of an MDI-based 1K polyurethane adhesive.

It is an object of the present invention to provide a thermally acceleratable adhesive composition which is isocyanate-free, does not produce gas on curing, is formulated as one component, and advantageously has a comparatively low calorific value.

The object is achieved by a reactive one-component adhesive composition which is liquid at room temperature, containing, based on the total weight of the composition,
 a) 3 wt % to 90 wt % of at least one alpha-silane-terminated organic polymer;
 b) 0 wt % to 80 wt % of at least one silicone resin;
 c) 0.1 wt % to 5 wt % of at least one thermal accelerator;
 d) 0.001 wt % to 5 wt % of at least one low molecular weight silane which has a primary or secondary amino group or a blocked amino group which hydrolyzes to the primary or secondary amino group;
 e) 0 wt % to 85 wt % of at least one filler.

The object is also achieved by a method for bonding two substrates, containing the steps of
 (a) applying a reactive one-component adhesive composition of the invention to a first substrate, to give an adhesive area,
 (b) contacting a second substrate with the adhesive area from step (a), and
 (c) thermally curing the adhesive composition, preferably at a temperature of at least 50° C.

The object is also achieved by a bonded substrate system composed of two substrates, where the two substrates have a common adhesive area via which the two substrates are bonded using a thermally cured adhesive composition of the invention, more particularly by the method of the invention.

Surprisingly it has emerged that the bonding of two substrates, especially for the production of sandwich elements, meets industrial cycle times by means of the adhesive composition of the invention. The adhesive composition of the invention is notable for its ease of processing, its broad adhesive spectrum, and its low-odor curing in numerous applications, particularly in the automotive and construction sectors, where there is a requirement to replace existing solvent-containing or isocyanate-containing adhesives (e.g., sealants, flooring adhesives, assembly adhesives). The rapid full-curing opens up the possibility for numerous industrial applications. The present invention also relates, correspondingly, to the use of an adhesive composition of the invention in the automotive and construction sectors.

It has furthermore surprisingly emerged that with a mixture containing so-called alpha-silanes (α-silanes) and, optionally, silicone resins as are described in WO 2003/014 226 A1, WO 2010/066 826 A1 or WO 2013/026 654 A1, in combination with a thermally labile accelerator as is described in DE 60 116 825 T2, in the presence of a low molecular weight silane and optionally fillers and further additives, the object can be satisfactorily achieved.

In this way it is possible to produce roof linings for motor vehicles by a commonplace method for bonding two substrates. A further aspect of the present invention, accordingly, concerns the method of the invention for bonding two substrates, where the bonded substrate system obtainable constitutes roof linings for motor vehicles. Substrate systems of the invention corresponding may be roof linings for motor vehicles.

The reactive one-component adhesive composition of the invention therefore differs from two-component adhesives and from surface coating materials. Moreover, the reactive one-component adhesive composition of the invention is liquid at room temperature, so distinguishing it from hotmelt adhesives, which are solid at room temperature. In the context of the present invention, accordingly, the term "liquid" is considered in delimitation from "solid". In any case, a maximum Brookfield-method viscosity of 1000 Pa*s at 20 rpm and 25° C. ought not to be exceeded.

The reactive one-component adhesive composition of the invention is preferably free of monomeric isocyanates. In the context of the present invention, "free of monomeric isocyanates" denotes a fraction of less than 1 wt %, based on the total amount of the composition. The fraction is preferably <0.1 wt %.

The reactive one-component adhesive composition of the invention preferably contains, based on the total weight of the composition:
a) 3 wt % to 90 wt % of the at least one alpha-silane-terminated organic polymer;
b) 0 wt % to 50 wt % of the at least one silicone resin;
c) 0.1 wt % to 5 wt % of the at least one thermal accelerator;
d) 0.001 wt % to 5 wt % of the at least one low molecular weight silane which has a primary or secondary amino group or a blocked amino group which hydrolyzes to the primary or secondary amino group;
e) 0 wt % to 80 wt % of the at least one filler.

More preferably the reactive one-component adhesive composition of the invention contains, based on the total weight of the composition:
a) 3 wt % to 50 wt % of the at least one alpha-silane-terminated organic polymer;
b) 1 wt % to 30 wt % of the at least one silicone resin;
c) 0.1 wt % to 2.5 wt % of the at least one thermal accelerator;
d) 0.01 wt % to 5 wt % of the at least one low molecular weight silane which has a primary or secondary amino group or a blocked amino group which hydrolyzes to the primary or secondary amino group;
e) 10 wt % to 80 wt % of the at least one filler.

More preferably still, the reactive one-component adhesive composition of the invention contains, based on the total weight of the composition:
a) 5 wt % to 25 wt % of the at least one alpha-silane-terminated organic polymer;
b) 5 wt % to 20 wt % of the at least one silicone resin;
c) 0.1 wt % to 1 wt % of the at least one thermal accelerator;
d) 0.1 wt % to 4 wt % of the at least one low molecular weight silane which has a primary or secondary amino group or a blocked amino group which hydrolyzes to the primary or secondary amino group;
e) 30 wt % to 80 wt % of the at least one filler.

More preferably still, the reactive one-component adhesive composition of the invention contains, based on the total weight of the composition:
a) 15 wt % to 25 wt % of the at least one alpha-silane-terminated organic polymer;
b) 10 wt % to 12 wt % of the at least one silicone resin;
c) 0.2 wt % to 0.5 wt % of the at least one thermal accelerator;
d) 1 wt % to 3 wt % of the at least one low molecular weight silane which has a primary or secondary amino group or a blocked amino group which hydrolyzes to the primary or secondary amino group;
e) 59.5 wt % to 73.8 wt % of the at least one filler.

The reactive one-component adhesive composition of the invention contains components a) to e), with components b) and e) being optional (0 wt %). Correspondingly the reactive one-component adhesive composition of the invention contains components a), c), d) or components a), b) at ≥0.1 wt %, c), d) or components a), c), d), e) at ≥0.1 wt %, or components a), b) at ≥0.1 wt %, c), d), e) at ≥0.1 wt %.

The composition of the invention may additionally comprise further constituents. One embodiment of the present invention, accordingly, relates to a reactive one-component adhesive composition of the invention which consists of the above-recited components. A further embodiment of the present invention relates to a reactive one-component adhesive composition of the invention which as well as the above-recited components further comprises one or more, such as two, three, four, five, six, seven, eight, nine or ten, components.

The reactive one-component adhesive composition of the invention contains at least one alpha-silane-terminated organic polymer. The reactive one-component adhesive composition of the invention may therefore comprise one alpha-silane-terminated polymer or two or more, such as two, three or four, polymers. In this case it is clear to the competent skilled person that polymers do not represent pure substances but instead occur, as a result of their production, in the form of a mixture of substances having a characteristic substance distribution and that, therefore, "a polymer" is a simplifying term for this mixture of substances.

Alpha-silane-terminated organic polymers are known to the skilled person and may be obtained commercially, for example. For instance, Wacker Chemie AG, Munich (DE) markets such alpha-silane-modified polymers under the Geniosil® name, such as Geniosil® STP-E10 or Geniosil® XB 502.

Alpha-silanes are notable for the so-called alpha effect. With this effect, the vicinity of an electronegative donor, such as nitrogen or oxygen, in alpha position to the silicon atom, i.e., separated from it only by a methylene bridge, for example, results in activation of alkoxy groups on the silicon atom. These groups as a result are more reactive toward nucleophiles, such as water. This in turn produces accelerated hydrolysis, without the need, for example, for tin-containing catalysts. The silanes may be hydrolyzed to siloxanes with crosslinking. Accordingly, reactive one-component adhesive compositions of the invention are alpha-silane-terminated adhesives which are able to undergo moisture-crosslinking reaction to form siloxanes.

The at least one alpha-silane-terminated organic polymer is preferably an alpha-silane-terminated organic polymer of the formula (I)

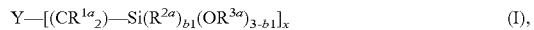
$$Y-[(CR^{1a}{}_2)-Si(R^{2a})_{b1}(OR^{3a})_{3-b1}]_x \qquad (I),$$

where
Y is an x-valent polymer radical bonded via nitrogen, oxygen or sulfur, $R^{2a}$ may be identical or different and is a monovalent, optionally substituted, SiC-bonded hydrocarbon radical, $R^{1a}$ may be identical or different and is hydrogen atom or a monovalent, optionally substituted hydrocarbon radical which may be attached to the carbon atom via nitrogen, phosphorus, oxygen, sulfur or carbonyl group, $R^{3a}$ may be identical or different and is hydrogen atom or a monovalent, optionally substituted hydrocarbon radical, x is an integer from 1 to 10, b1 may be identical or different and is 0, 1 or 2.

Such alpha-silane-terminated organic polymers are known from WO 2003/014 226 A1, WO 2010/066 826 A1 or WO 2013/026 654 A1.

Accordingly, examples of radicals $R^{2a}$ are alkyl radicals, such as the methyl, ethyl, n-propyl, isopropyl, 1-n-butyl, 2-n-butyl, isobutyl, tert-butyl, n-pentyl, isopentyl, neopentyl, tert-pentyl radical; hexyl radicals, such as the n-hexyl radical; heptyl radicals, such as the n-heptyl radical; octyl radicals, such as the n-octyl radical, isooctyl radicals and the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; cycloalkyl radicals, such as the cyclopentyl, cyclohexyl, cycloheptyl radical and methylcyclohexyl radical; alkenyl radicals, such as the vinyl, 1-propenyl and the 2-propenyl radical; aryl radicals, such as the phenyl, naphthyl, anthryl and phenanthryl radical; alkaryl radicals, such as o-, m-, and p-tolyl radicals; xylyl radicals and ethylphenyl radicals; and aralkyl radicals, such as the benzyl radical, the alpha- and the beta-phenylethyl radical. Examples of substituted radicals $R^{2a}$ are haloalkyl radicals such as the 3,3,3-trifluoro-n-propyl radical, the 2,2,2',2',2'-hexafluoroisopropyl radical and the heptafluoroisopropyl radical and haloaryl radicals, such as the o-, m- and p-chlorophenyl radical. The radical $R^{2a}$ preferably comprises monovalent hydrocarbon radicals optionally substituted by halogen atoms and having 1 to 6 carbon atoms, more preferably alkyl radicals having 1 or 2 carbon atoms, more particularly the methyl radical.

Examples of radicals $R^{1a}$ are a hydrogen atom, the radicals specified for $R^{2a}$, and also optionally substituted hydrocarbon radicals bonded to the carbon atom via nitrogen, phosphorus, oxygen, sulfur, carbon or carbonyl group. Radical $R^{1a}$ preferably comprises a hydrogen atom and hydrocarbon radicals having 1 to 20 carbon atoms, more particularly a hydrogen atom.

Examples of radicals $R^{3a}$ are a hydrogen atom or the examples specified for radical $R^{2a}$. The radical $R^{3a}$ preferably comprises a hydrogen atom or alkyl radicals having 1 to 10 carbon atoms and optionally substituted by halogen atoms, more preferably comprises alkyl radicals having 1 to 4 carbon atoms, more particularly the methyl and ethyl radical.

Polymers on which the polymer radical Y is based are, in the sense of the present invention, all polymers in which at least 50%, preferably at least 70% and more preferably at least 90% of all the bonds in the main chain are carbon-carbon, carbon-nitrogen or carbon-oxygen bonds. Polymer radical Y preferably comprises organic polymer radicals whose polymer chain comprises polyoxyalkylenes, such as polyoxyethylene, polyoxypropylene, polyoxybutylene, polyoxytetramethylene, polyoxyethylene-polyoxypropylene copolymer and polyoxypropylene-polyoxybutylene copolymer; hydrocarbon polymers, such as polyisobutylene, polyethylene or polypropylene and copolymers of polyisobutylene with isoprene; polyisoprenes; polyurethanes; polyesters; polyamides; polyacrylates; polymethacrylates and polycarbonates, and which are bonded preferably via —O—C(=O)—NH—, —NH—C(=O)—O—, —NH—C(=O)—NH—, —NR'—C(=O)—NH—, NH—C(=O)—NR'—, —NH—C(=O)—, —C(=O)—NH—, —C(=O)—O—, —O—C(=O)—, —O—C(=O)—O—, —S—C(=O)—NH—, —NH—C(=O)—S—, —C(=O)—S—, —S—C(=O)—, —S—C(=O)—S—, —C(—O)—, —S—, —O— and —NR'— to the group or groups —[(CR$^{1a}$₂)—Si(R$^{2a}$)$_{b1}$(OR$^{3a}$)$_{3-b1}$], where R' may be identical or different and has a definition specified for $R^{2a}$ or is a group —CH(COOR")—CH₂—C(O)OR", in which R" may be identical or different and has a definition specified for $R^{2a}$. Examples of radicals R' are cyclohexyl, cyclopentyl, n- and isopropyl, n-, iso- and t-butyl, the various stereoisomers of the pentyl radical, hexyl radical or heptyl radical, and also the phenyl radical. Radical R' preferably comprises a group —CH(COOR")—CH₂—COOR" or an optionally substituted hydrocarbon radical having 1 to 20 carbon atoms, more preferably a linear, branched or cyclic alkyl group having 1 to 20 carbon atoms, or an aryl group having 6 to 20 carbon atoms and optionally substituted by halogen atoms. The radicals R" are preferably alkyl groups having 1 to 10 carbon atoms, more preferably methyl, ethyl or propyl radicals.

With particular preference radical Y in formula (I) comprises polyurethane radicals and polyoxyalkylene radicals, more particularly polyoxypropylene-containing polyurethane radicals or polyoxypropylene radicals.

In one particularly preferred configuration of the invention, at least one alpha-silane-terminated organic polymer comprises silane-terminated polyethers and silane-terminated polyurethanes, more particularly silane-terminated polypropylene glycols and silane-terminated polyurethanes each having dimethoxymethylsilyl, trimethoxysilyl, diethoxymethylsilyl or triethoxysilyl end groups attached via —O—C(=O)—NH—C(R$^{1a}$)₂ groups or —NH—C(=O)—NR'—C(R$^{1a}$)₂ groups, where R' and $R^{1a}$ have one of the definitions specified above.

The mean molecular weights Mn of the alpha-silane-terminated organic polymers are preferably at least 400 g/mol, more preferably at least 600 g/mol, more particularly at least 800 g/mol and preferably at most 30 000 g/mol, more preferably at most 19 000 g/mol, more particularly at most 13 000 g/mol. The viscosity is preferably at least 0.2 Pas, more preferably at least 1 Pas, very preferably at least 5 Pas, and preferably at most 1000 Pas, more preferably at most 700 Pas, in each case measured at 20° C.

The alpha-silane-terminated organic polymers used in the invention are commercially customary products or may be prepared by methods which are commonplace in chemistry. The alpha-silane-terminated organic polymers may be prepared by various known processes, such as addition reactions, for example hydrosilylation, Michael addition, Diels-Alder addition, or reactions between isocyanate-functional compounds and compounds which have isocyanate-reactive groups.

With very particular preference the at least one alpha-silane-terminated organic polymer is a polymer which has at least one end group, preferably at least two and more particularly a multiplicity of end groups, of the formula

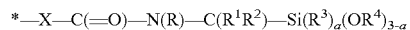

where

X is O or N(R);
each R independently of any other is hydrogen or a hydrocarbon radical having 1 to 20 carbon atoms;
$R^1$ and $R^2$ independently of one another are hydrogen or a hydrocarbon radical having 1 to 20 carbon atoms;
$R^3$ and $R^4$ independently of one another are a hydrocarbon radical having 1 to 20 carbon atoms;
a is 0, 1 or 2, and
"*" marks the bond for the attachment to the polymer.

More preferably R is hydrogen or an alkyl radical which has 1 to 4 carbon atoms, it being possible for the alkyl radical to be straight-chain or branched. More preferably still, R is H, methyl or ethyl, and more preferably still is hydrogen or methyl.

R especially preferably is hydrogen.

More preferably $R^1$ and $R^2$ are identical. More preferably still, $R^1$ and $R^2$ are hydrogen or an alkyl radical which has 1 to 4 carbon atoms, it being possible for the alkyl radical to be straight-chain or branched. More preferably still, $R^1$ and $R^2$ are H, methyl or ethyl, and more preferably still are hydrogen or methyl.

$R^1$ and $R^2$ especially preferably are hydrogen.

More preferably $R^3$ and $R^4$ are identical. More preferably still, $R^3$ and $R^4$ are an alkyl radical which has 1 to 4 carbon atoms, it being possible for the alkyl radical to be straight-chain or branched. More preferably still, $R^3$ and $R^4$ are methyl or ethyl.

$R^3$ and $R^4$ especially preferably are methyl.

Preferably a is 0 or 1; more preferably a is 1.

An illustrative at least one alpha-silane-terminated organic polymer is a polymer which has at least one end group of the formula *—O—C(=O)—NH—$CH_2$—Si$(CH_3)(OCH_3)_2$.

The organic polymer is preferably a polyoxyalkylene, a hydrocarbon polymer, a polyurethane, a polyester, a polyamide, a polysiloxane, a polyacrylate, a polymethacrylate or a polycarbonate. Polyoxyalkylene is preferred. The organic polymer preferably contains no silane groups other than the above-recited end groups.

Preferred polyoxyalkylenes are polypropylenes, having for example a number-average molecular weight in the range from 5000 g/mol to 50 000 g/mol, more preferably from 7500 g/mol to 30 000 g/mol, more preferably from 10 000 g/mol to 15 000 g/mol.

The reactive one-component adhesive composition of the invention may additionally comprise at least one silicone resin. There may therefore be one or more, such as two, three or four, different silicone resins present. Preference is given to only one silicone resin. These silicone resins are different from the alpha-silane-terminated organic polymers which are included in component a).

Preference is given to a phenyl silicone resin. Silicone resins are described for example in DE 10 2013 213 835 A1. A silicone resin is considered an additional component in the context of the present invention if it is not already one of the above-designated components.

Accordingly, possible silicone resins as per DE 10 2013 213 835 A1 contain units of the formula

(II), where $R^{3'}$ may be identical or different and is hydrogen atom, a monovalent, SiC-bonded, optionally substituted aliphatic hydrocarbon radical or a divalent, optionally substituted, aliphatic hydrocarbon radical which bridges two units of the formula (II), $R^{4'}$ may be identical or different and is hydrogen atom or a monovalent, optionally substituted hydrocarbon radical, $R^{5'}$ may be identical or different and is a monovalent, SiC-bonded, optionally substituted aromatic hydrocarbon radical, c' is 0, 1, 2 or 3,
d' is 0, 1, 2 or 3, preferably 0, 1 or 2, more preferably 0 or 1, and
e' is 0, 1 or 2, preferably 0 or 1,
with the proviso that the sum of c'+d'+e' is less than or equal to 3, in at least one unit e' is other than 0, and in at least 40% of the units of the formula (II) the sum c'+e' is 0 or 1.

Suitable silicone resins consist preferably to an extent of at least 90 wt % of units of the formula (II), more preferably exclusively of units of the formula (II).

Examples of radicals $R^{3'}$ are alkyl radicals, such as the methyl, ethyl, n-propyl, isopropyl, 1-n-butyl, 2-n-butyl, isobutyl, tert-butyl, n-pentyl, isopentyl, neopentyl, tert-pentyl radical; hexyl radicals, such as the n-hexyl radical; heptyl radicals, such as the n-heptyl radical; octyl radicals, such as the n-octyl radical, isooctyl radicals, and the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; cycloalkyl radicals, such as the cyclopentyl, cyclohexyl, cycloheptyl radical and methylcyclohexyl radicals; alkenyl radicals, such as the vinyl, 1-propenyl and the 2-propenyl radical; aryl radicals, such as the phenyl, naphthyl, anthryl and phenanthryl radical; alkaryl radicals, such as o-, m-, p-tolyl radicals; xylyl radicals and ethylphenyl radicals; and aralkyl radicals, such as the benzyl radical, the o- and the ε-phenylethyl radical.

Examples of substituted radicals $R^{3'}$ are haloalkyl radicals, such as the 3,3,3-trifluoro-n-propyl radical, the 2,2,2,2',2',2'-hexafluoroisopropyl radical and the heptafluoroisopropyl radical, and haloaryl radicals, such as the o-, m- and p-chlorophenyl radical.

Radical $R^{3'}$ preferably comprises monovalent hydrocarbon radicals having 1 to 6 carbon atoms and optionally substituted by halogen atoms, more preferably comprises alkyl radicals having 1 or 2 carbon atoms, more particularly the methyl radical. The radical $R^{3'}$ may alternatively comprise divalent aliphatic radicals which join two silyl groups of the formula (II) to one another, such as, for example, alkylene radicals having 1 to 10 carbon atoms, for instance methylene, ethylene, propylene or butylene radicals.

Preferably, however, radical $R^{3'}$ comprises monovalent SiC-bonded aliphatic hydrocarbon radicals which are optionally substituted by halogen atoms and have 1 to 18 carbon atoms, more preferably aliphatic hydrocarbon radicals having 1 to 6 carbon atoms, more particularly the methyl radical.

Examples of radical $R^{4'}$ are hydrogen atom or the examples specified for radical $R^3$.

Radical $R^{4'}$ is preferably a hydrogen atom or comprises alkyl radicals optionally substituted by halogen atoms and having 1 to 10 carbon atoms, more preferably alkyl radicals having 1 to 4 carbon atoms, more particularly the methyl and ethyl radical.

Examples of radicals $R^{5'}$ are the aromatic radicals specified above for $R^{3'}$.

Radical $R^{5'}$ preferably comprises SiC-bonded aromatic hydrocarbon radicals which are optionally substituted by halogen atoms and have 1 to 18 carbon atoms, such as, for example, ethylphenyl, toluyl, xylyl, chlorophenyl, naphthyl or styryl radicals, more preferably the phenyl radical.

Preference is given to using silicone resins in which at least 90% of all the radicals $R^{3'}$ are methyl radical, at least 90% of all the radicals $R^{4'}$ are methyl, ethyl, propyl or isopropyl radical, and at least 90% of all the radicals $R^5$ are phenyl radical.

Preferred silicone resins are those having at least 40%, more preferably at least 60%, of units of the formula (II) in which c' is 0, based in each case on the total number of units of the formula (II).

Preference is given to using silicone resins which, based in each case on the total number of units of the formula (II), have at least 70%, more preferably at least 80%, of units of the formula (II) in which d' has a value of 0 or 1.

Preference is given to using silicone resins which, based in each case on the total number of units of the formula (II), have at least 20%, more preferably at least 40%, of units of the formula (II) in which e' has a value of 1. It is possible to use silicone resins which have exclusively units of the formula (II) in which e' is 1, but with particular preference at least 10%, more preferably at least 20%, at most 60%, more preferably at most 80%, of the units of the formula (II) have an e' of 0.

Preference is given to using silicone resins which, based in each case on the total number of units of the formula (II), have at least 50%, more preferably at least 70%, more particularly at least 80%, of units of the formula (II) in which the sum of c'+e' is 1.

One particularly preferred embodiment of the invention uses silicone resins which, based in each case on the total number of units of the formula (II), have at least 20%, more preferably at least 40%, of units of the formula (II) in which e' has a value of 1 and c' has a value of 0. Preferably in this case at most 40%, more preferably at most 70%, of all the units of the formula (II) have a d' other than 0.

In a further particularly preferred embodiment of the invention, silicone resins used are resins which, based in each case on the total number of units of the formula (II), have at least 20%, more preferably at least 40%, of units of the formula (II) in which e' has a value of 1 and c' has a value of 0 and which also have at least 1%, preferably at least 10%, of units of the formula (II) in which c' is 1 or 2, preferably 1, and e' is 0.

Examples of the silicone resins are organopolysiloxane resins which consist substantially, preferably exclusively, of (Q) units of the formulae $SiO_{4/2}$, $Si(OR^4)O_{3/2}$, $Si(OR^4)_2O_{2/2}$ and $Si(OR^4)_3O_{1/2}$, (T) units of the formulae $PhSiO_{3/2}$, $PhSi(OR^{4'})O_{2/2}$, $PhSi(OR^{4'})_2O_{1/2}$, $MeSiO_{3/2}$, $MeSi(OR^{4'})O_{2/2}$ and $MeSi(OR^{4'})_2O_{1/2}$, (D) units of the formulae $Me_2SiO_{2/2}$, $Me_2Si(OR^4)O_{1/2}$, $Ph_2SiO_{2/2}$ and $Ph_2Si(OR^4)O_{1/2}$, $MePhSiO_{2/2}$ and $MePhSi(OR^4)O_{1/2}$, and also (M) units of the formula $Me_3SiO_{1/2}$, where Me is a methyl radical, Ph is a phenyl radical and $R^{4'}$ is hydrogen atom or comprises alkyl radicals optionally substituted by halogen atoms and having 1 to 10 carbon atoms, more preferably hydrogen atom or alkyl radicals having 1 to 4 carbon atoms, where the resin per mole of (T) units contains 0-2 mol of (Q) units, 0-2 mol of (D) units and 0-2 mol of (M) units.

Preferred examples of silicone resins are organopolysiloxane resins which consist substantially, preferably exclusively, of T units of the formulae $PhSiO_{3/2}$, $PhSi(OR^{4'})O_{2/2}$ and $PhSi(OR^{4'})_2O_{1/2}$, T units of the formulae $MeSiO_{3/2}$, $MeSi(OR^{4'})O_{2/2}$ and $MeSi(OR^{4'})_2O_{1/2}$ and also D units of the formulae $Me_2SiO_{2/2}$ and $Me_2Si(OR^4)O_{1/2}$, where Me is a methyl radical, Ph is a phenyl radical and $R^{4'}$ is a hydrogen atom or comprises alkyl radicals optionally substituted by halogen atoms and having 1 to 10 carbon atoms, more preferably hydrogen atom or alkyl radicals having 1 to 4 carbon atoms, with a molar ratio of (T) to (D) units of 0.5 to 2.0.

Among these examples, particular preference is given to silicone resins whose units of the formula (II) are formed to an extent of at least 50%, preferably at least 70%, more particularly at least 85% of T units of the formulae $PhSiO_{3/2}$, $PhSi(OR^4)O_{2/2}$, $PhSi(OR^4)_2O_{1/2}$, $MeSiO_{3/2}$, $MeSi(OR^{4'})O_{2/2}$ and $MeSi(OR^{4'})_2O_{1/2}$, with these silicone resins containing at least 30%, preferably at least 40%, more particularly at least 50% of T units of the formulae $PhSiO_{3/2}$, $PhSi(OR^4)O_{2/2}$ and $PhSi(OR^4)_2O_{1/2}$ and at least 10%, preferably at least 15%, more particularly at least 20% of T units of the $MeSiO_{3/2}$, $MeSi(OR^{4'})O_{2/2}$ and $MeSi(OR^{4'})_2O_{1/2}$.

The silicone resins preferably possess a mean molar mass (number average) Mn of at least 500 g/mol and more preferably of at least 600 g/mol. The mean molar mass Mn is preferably at most 400 000 g/mol, more preferably at most 100 000 g/mol, more particularly at most 50 000 g/mol.

Such silicone resins may be either solid or liquid at 23° C. and 1000 hPa with silicone resins preferably being liquid.

The silicone resins are commercially customary products (for example, Silres® IC 368 from Wacker Chemie (DE)) or they may be prepared by methods commonplace within silicon chemistry.

The reactive one-component adhesive composition of the invention additionally comprises at least one thermal accelerator. Hence there may be a thermal accelerator included. It is also possible for two or more, such as two, three or four, thermal accelerators to be included.

Thermal accelerators are described in the prior art, as for example in DE 60 116 825 T2. The at least one thermal accelerator is preferably a bicyclic tertiary amine of the following formula (II):

in which n is an integer from 1 to 3, or a salt thereof. With particular preference the at least one thermal accelerator is DBU (1,8-diazabicyclo[5.4.0]undec-7-ene) or a salt thereof.

Preference is given to using a salt of the bicyclic tertiary amine, more particularly a salt of the bicyclic tertiary amine with an aliphatic monocarboxylic acid, where the monocarboxylic acid is preferably selected from the group consisting of methacrylic acid, crotonic acid and tiglic acid, where the mixing ratio is preferably established such that the molar ratio of the bicyclic tertiary amine to the aliphatic monocarboxylic acid is at most 1.3.

In particular the crotonic acid salt of DBU is preferred.

The reactive one-component adhesive composition of the invention additionally comprises at least one low molecular weight silane which contains a primary or secondary, preferably a primary, amino group or a blocked amino group which hydrolyzes to the primary or secondary amino group. Component d) may therefore comprise one or more, such as two, three or four, such silanes. Preferably component d) consists only of one component. Component d) is different from components a) to c) and is included in component d) only insofar as it cannot be interpreted as one of components a) to c).

The at least one low molecular weight silane of component d) has a primary amino group —$NH_2$. The amino group in this case may be part of a functional group, such as, for example, of an amide group —C(=O)$NH_2$, or may be a primary amine in the narrower sense. Advantageously it is an amine. Low molecular weight silanes which have a secondary amino group may also be used. It is possible, moreover, to use blocked amino silanes. In these cases the blocked amino group hydrolyzes to the primary or secondary amino group, preferably to the primary amino group. An example would be ((triethoxysilyl)propyl)methylisobutylimine, which is sold under the tradename VPS 1262 by Evonik (DE). Here as well the amino group may be part of a functional group or is an amino group, this being preferred. It is of course possible for two or more primary amino groups to be present, more particularly two or more primary amino groups, two or more secondary amino groups, and at least one primary and at least one secondary amino group. In place of the primary or secondary amino group, the blocked form thereof may of course be present. Preferred, however, is a primary or secondary, more preferably a primary, amino group.

Advantageous low molecular weight silanes have a molecular weight in the range from 100 g/mol to 500 g/mol.

Preferred low molecular weight silanes are described in DE 10 2012 200790 A1. Accordingly, preferred low molecular weight silanes are those containing units of the formula

$DSi(OR^{7'})_{g'}R^{8'}_{(3-g')}$ (IX), in which

R$^{7'}$ may be identical or different and denotes hydrogen atom or optionally substituted hydrocarbon radicals, D may be identical or different and denotes a monovalent, SiC-bonded radical with basic nitrogen of a primary or secondary or blocked amino group, R$^{8'}$ may be identical or different and denotes a monovalent, optionally substituted, SiC-bonded organic radical free from basic nitrogen, g' is 1, 2 or 3, preferably 2 or 3.

Examples of optionally substituted hydrocarbon radicals R$^{7'}$ are the examples specified for radical R$^{3'}$ below.

The radicals R$^{7'}$ preferably comprise hydrogen atom and hydrocarbon radicals optionally substituted by halogen atoms and having 1 to 18 carbon atoms, more preferably hydrogen atom and hydrocarbon radicals having 1 to 10 carbon atoms, more particularly methyl and ethyl radical.

Examples of radical R$^{8'}$ are the examples specified for R$^{3'}$ below.

Radical R$^{8'}$ preferably comprises hydrocarbon radicals optionally substituted by halogen atoms and having 1 to 18 carbon atoms, more preferably hydrocarbon radicals having 1 to 5 carbon atoms, more particularly the methyl radical.

Examples of radicals D are radicals of the formulae $H_2N(CH_2)_3$—, $H_2N(CH_2)_2NH(CH_2)_3$—, $H_2N(CH_2)_2NH(CH_2)_2NH(CH_2)_3$—, $H_3CNH(CH_2)_3$—, $C_2H_5NH(CH_2)_3$—, $C_3H_7NH(CH_2)_3$—, $C_4H_9NH(CH_2)_3$—, $C_5H_{11}NH(CH_2)_3$—, $C_6H_{13}NH(CH_2)_3$—, $C_7H_{15}NH(CH_2)_3$—, $H_2N(CH_2)_4$—, $H_2N$—$CH_2$—$CH(CH_3)$—$CH_2$—, $H_2N(CH_2)_5$—, cyclo-$C_5H_9NH(CH_2)_3$—, cyclo-$C_6H_{11}NH(CH_2)_3$—, phenyl-$NH(CH_2)_3$—, $(CH_3)_2N(CH_2)_3$—, $(C_2H_5)_2N(CH_2)_3$—, $(C_3H_7)_2NH(CH_2)_3$—, $(C_4H_9)_2NH(CH_2)_3$—, $(C_5R_{11})_2NH(CH_2)_3$—, $(C_6H_{13})_2NH(CH_2)_3$—, $(C_7H_{15})_2NH(CH_2)_3$—, $H_2N(CH_2)$—, $H_2N(CH_2)_2NH(CH_2)$—, $H_2N(CH_2)_2NH(CH_2)_2NH(CH_2)$—, $H_3CNH(CH_2)$—, $C_2H_5NH(CH_2)$—, $C_3H_7NH(CH_2)$—, $C_4H_9NH(CH_2)$—, $C_5H_{11}NH(CH_2)$—, $C_6H_{13}NH(CH_2)$—, $C_7H_{15}NH(CH_2)$—, cyclo-$C_5H_9NH(CH_2)$—, cyclo-$C_6H_{11}NH(CH_2)$—, phenyl-$NH(CH_2)$—, $(CH_3)_2N(CH_2)$—, $(C_2H_5)_2N(CH_2)$—, $(C_3H_7)_2NH(CH_2)$—, $(C_4H_9)_2NH(CH_2)$—, $(C_5H_{11})_2NH(CH_2)$—, $(C_6H_{13})_2NH(CH_2)$—, $(C_7H_{15})_2NH(CH_2)$—, $(CH_3O)_3Si(CH_2)_3NH(CH_2)_3$—, $(C_2H_5O)_3Si(CH_2)_3NH(CH_2)_3$—, $(CH_3O)_2(CH_3)Si(CH_2)_3NH(CH_2)_3$— and $(C_2H_5O)_2(CH_3)Si(CH_2)_3NH(CH_2)_3$— and also reaction products of the abovementioned primary amino groups with compounds containing epoxide groups or double bonds reactive toward primary amino groups (i.e., containing blocked amino groups).

Examples of the silanes of the formula (IX) are $H_2N(CH_2)_3$—$Si(OCH_3)_3$, $H_2N(CH_2)_3$—$Si(OC_2H_5)_3$, $H_2N(CH_2)_3$—$Si(OCH_3)_2CH_3$, $H_2N(CH_2)_3$—$Si(OC_2H_5)_2CH_3$, $H_2N(CH_2)_2NH(CH_2)_3$—$Si(OCH_3)_3$, $H_2N(CH_2)_2NH(CH_2)_3$—$Si(OC_2H_5)_3$, $H_2N(CH_2)_2NH(CH_2)_3$—$Si(OCH_3)_2CH_3$, $H_2N(CH_2)_2NH(CH_2)_3$—$Si(OC_2H_5)_2CH_3$, $H_2N(CH_2)_2NH(CH_2)_3$—$Si(OH)_3$, $H_2N(CH_2)_2NH(CH_2)_3$—$Si(OH)_2CH_3$, $H_2N(CH_2)_2NH(CH_2)_2NH(CH_2)_3Si$—$(OCH_3)_3$, $H_2N(CH_2)_2NH(CH_2)_2NH(CH_2)_3$—$Si(OC_2H_5)_3$, cyclo-$C_6H_{11}NH(CH_2)_3Si$—$(OCH_3)_3$, cyclo-$C_6H_{11}NH(CH_2)_3$—$Si(OC_2H_5)_3$, cyclo-$C_6H_{11}NH(CH_2)_3$—$Si(OCH_3)_2CH_3$, cyclo-$C_6H_{11}NH(CH_2)_3$—$Si(OC_2H_5)_2CH_3$, cyclo-$C_6H_{11}NH(CH_2)_3$—$Si(OH)_3$, cyclo-$C_6H_{11}NH(CH_2)_3$—$Si(OH)_2CH_3$, phenyl-$NH(CH_2)_3$—$Si(OCH_3)_3$, phenyl-$NH(CH_2)_3$—$Si(OC_2H_5)_3$, phenyl-$NH(CH_2)_3$—$Si(OCH_3)_2CH_3$, phenyl-$NH(CH_2)_3$—$Si(OC_2H_5)_2CH_3$, phenyl-$NH(CH_2)_3$—$Si(OH)_3$, phenyl-$NH(CH_2)_3$—$Si(OH)_2CH_3$, $HN((CH_2)_3$—$Si(OCH_3)_3)_2$, $HN((CH_2)_3$—$Si(OC_2H_5)_3)_2HN((CH_2)_3$—$Si(OCH_3)_2CH_3)_2$, $HN((CH_2)_3$—$Si(OC_2H_5)_2CH_3)_2$, cyclo-$C_6H_{11}NH(CH_2)$—$Si(OCH_3)_3$, cyclo-$C_6H_{11}NH(CH_2)$—$Si(OC_2H_5)_3$, cyclo-$C_6H_{11}NH(CH_2)$—$Si(OCH_3)_2CH_3$, cyclo-$C_6H_{11}NH(CH_2)$—$Si(OC_2H_5)_2CH_3$, cyclo-$C_6H_{11}NH(CH_2)$—$Si(OH)_3$, cyclo-$C_6H_{11}NH(CH_2)$—$Si(OH)_2CH_3$, phenyl-$NH(CH_2)$—$Si(OCH_3)_3$, phenyl-$NH(CH_2)$—$Si(OC_2H_5)_3$, phenyl-$NH(CH_2)$—$Si(OCH_3)_2CH_3$, phenyl-$NH(CH_2)$—$Si(OC_2H_5)_2CH_3$, phenyl-$NH(CH_2)$—$Si(OH)_3$ and phenyl-$NH(CH_2)$—$Si(OH)_2CH_3$ and also partial hydrolysates thereof, with preference being given to $H_2N(CH_2)_2NH(CH_2)_3$—$Si(OCH_3)_3$, $H_2N(CH_2)_2NH(CH_2)_3$—$Si(OC_2H_5)_3$, $H_2N(CH_2)_2NH(CH_2)_3$—$Si(OCH_3)_2CH_3$, cyclo-$C_6H_{11}NH(CH_2)_3$—$Si(OCH_3)_3$, cyclo-$C_6H_{11}NH(CH_2)_3$—$Si(OC_2H_5)_3$ and cyclo-$C_6H_{11}NH(CH_2)_3$—$Si(OCH_3)_2CH_3$ and also in each case partial hydrolysates thereof and particular preference being given to $H_2N(CH_2)_2NH(CH_2)_3$—$Si(OCH_3)_3$, $H_2N(CH_2)_2NH(CH_2)_3$—$Si(OCH_3)_2CH_3$, cyclo-$C_6H_{11}NH(CH_2)_3$—$Si(OCH_3)_3$, cyclo-$C_6H_{11}NH(CH_2)_3$—$Si(OCH_3)_2CH_3$ and also in each case partial hydrolysates thereof.

Particularly preferred examples are also N-(2-aminoethyl)-3-aminopropyltrimethoxysilane, 3-aminopropyltrimethoxysilane, 3-(2-aminoethylamino)propyltriethoxysilane, N-(2-amino-ethyl)-3-aminopropyldimethoxysilane, or 3-ureidopropyltrimethoxysilane. Preferred in particular is 3-aminopropyltrimethoxysilane.

In addition the reactive one-component adhesive composition of the invention may additionally comprise at least one filler. Illustrative fillers are calcium carbonate, chalk for example, or alumina, such as fused alumina, for example.

Through the reactive one-component adhesive composition of the invention it is possible to realize high levels of filling, which may be advantageous in various applications. Examples to be mentioned here include applications which require good thermal conductivity or have particular requirements in terms of the fire behavior.

The reactive one-component adhesive composition of the invention may be used, for example, to produce sandwich elements. It has emerged that formulations using a thermal accelerator in the reactive one-component adhesive composition of the invention can be processed at room temperature over several minutes and are able to result in short pressing times under hot conditions beyond around 60° C. The use of amines as catalyst is described for example in WO 2019/004922 A1 for two-component coatings. The known commercial product Toyocat® DB 40 is a blocked amine and is mentioned for example in DE 10 2016 200 704 A1.

The reactive one-component adhesive composition of the invention may also comprise a water scavenger, such as vinyltrimethoxysilane, for example.

To lower the PCS value (heat of combustion), the reactive one-component adhesive composition of the invention may comprise the abovementioned fillers, such as chalk, for example. A low calorific value may be promoted by the use of the at least one silicone resin.

In the curing of the reactive one-component adhesive composition of the invention, methanol is eliminated by a condensation reaction where siloxane groups are formed.

In the case of the method of the invention, the reactive one-component adhesive composition of the invention may be applied to the substrate by means of the customary techniques, as for example by toothed spatula application, bead application, spray application or slot-die application, optionally sprayed with water, and then pressed for example at temperatures of at least 60° C. The reactive one-component adhesive composition of the invention is suitable especially for the production of roof linings in the automotive sector or for the production of panels. The reactive one-component adhesive composition of the invention is suitable especially for sandwich elements in which, in particular, aluminum plates are used. Also suitable in the context of the present invention are mineral wool panels, especially those having outer plies of stainless steel.

The present invention also relates, accordingly, to a method of the invention for bonding two substrates, where a bonded substrate system is obtained, and also to a substrate system of the invention, where the substrate system comprises roof linings in the automotive sector or panels. In addition the systems in question may preferably be sandwich elements in which, in particular, aluminum plates are used. Preferred panels are mineral wool panels, especially those having outer plies of stainless steel.

Furthermore, the present invention, while being especially suitable for aluminum plates or stainless steel plates that are difficult to bond, is nevertheless also very suitable in the case, for example, of sheet-steel outer plies that are uncoated or coated and easy to bond.

Correspondingly, the present invention also relates to a method of the invention for bonding two substrates, where a bonded substrate system is obtained, and also to a substrate system of the invention, where at least the first or the second substrate is an aluminum plate or stainless steel plate or is a coated or uncoated sheet-steel outer ply.

Surprisingly, after a few minutes, strengths are attained which correspond largely to the level of industrially employed 1K and 2K polyurethane adhesives.

EXAMPLES

Example 1 for an Adhesive Formulation of the Invention 180 g of Geniosil STP-E10, 120 g of Silres 368 and 15 g of Dynasylan VTMO were charged to a planetary mixer with butterfly stirrer. Subsequently, in portions, 700 g of CALCIT MX 30 were added and the mixture was stirred until the fillers were well-dispersed. The mixture was stirred at room temperature under reduced pressure (50 mbar) for 30 minutes. Then a further 15 g of vinyltrimethoxysilane, 4 g of accelerator from DE60116825T2, example 3 (mixture of DBU and crotonic acid), and 20 g of Geniosil GF95 were added and the mixture was stirred for a further 5 minutes under reduced pressure (50 mbar) (see table 1).

TABLE 1

Raw materials used and their proportion.

| Raw material | Manufacturer | Amount g | Fraction wt % |
|---|---|---|---|
| SILRES 368, silicone resin b) | Wacker | 120 | 11.4 |
| GENIOSIL STP-E10, α-silane term. polymer a) | Wacker | 180 | 17.1 |
| CALCIT MX 30, filler e) | SH MINERALS GMBH | 700 | 66.4 |
| GENIOSIL GF 95, aminosilane d) | Wacker | 20 | 1.9 |
| Accelerator (DE60116825T2, example 3), c) | — | 4 | 0.4 |
| Dynasylan VTMO, water scavenger | Evonik | 30 | 2.8 |

The physicochemical properties of the resultant formulation are set out in table 2.

TABLE 2

Physicochemical properties at 23° C.

| Parameter | Value | Unit |
|---|---|---|
| Viscosity at 6.8 s$^{-1}$ | 44 000 | mPa*s |
| Density | 1.7 | g/m$^2$ |
| Skin-forming time*⁾ | around 8 | minutes |

*⁾The skin-forming time is ascertained by pressing a wooden spatula into the bead of adhesive and then lifting it off again at 23° C. and 50% relative humidity. This procedure is repeated every 60 seconds until the adhesive no longer wets the wooden spatula.

Use Example 1 for a Method of the Invention (Production of a Roof Lining for Motor Vehicles)

Around 100 g/m$^2$ of the adhesive from inventive example 1 above are applied to a rigid foam material and sprayed with around 35 g/m$^2$ of water. The assembly produced from this system, consisting of an additional glass fiber mat and a fabric, is pressed at 120° C. for 40 s. After the end of the pressing time, the strength of the adhesive, in a manual peel test, is just above the inherent strength of the foam material, with the adhesive penetrating through the entire assembly.

Use Example 2 for a Method of the Invention (Production of Mineral Wool Panels)

Using a toothed spatula, around 400 g/m$^2$ of adhesive from the example above are applied to a (coated) metal sheet, and sprayed with around 100 g of water, and mineral wool having a density of around 110 kg/m$^3$ is inserted such that the fibers of the mineral wool stand vertically relative to the sheet. The assembly is pressed for 3.5 or 4.5 minutes at 60° C. Immediately after the pressing time, the assembly was torn by hand; a high proportion of fiber extraction was present.

This invention represents an isocyanate-free alternative by comparison with the reactive polyurethane adhesives used according to the present state of the art. The development of strength is comparable with that of polyurethane adhesives. The reactive one-component adhesive composition of the invention is suitable especially for sandwich elements in which aluminum plates are used. Also suitable in the context of the present invention are mineral wool panels, especially those having outer plies of stainless steel.

Presently employed for the production of mineral wool panels are 2K polyurethane adhesives which are mixed using low-pressure or high-pressure machines and are applied by spraying or pouring methods. These methods are highly demanding, susceptible to errors, and require investment in expensive machinery.

For the reactive one-component adhesive composition of the invention according to example 1, an EN ISO 1716 heat of combustion of 7.8 MJ/kg was ascertained. This comparatively low value is attributable to the high filler fraction on the one hand and the silicone resin fraction on the other. It is possible accordingly to produce mineral wool panels which meet class A2 according to DIN EN 13501:2019-05 at application rates of up to around 500 g/m². The reactive one-component adhesive composition of the invention according to example 1 also exhibits good heat resistance.

The invention claimed is:

1. A reactive one-component adhesive composition which is liquid at room temperature, containing, based on the total weight of the composition,
    a) 3 wt % to 90 wt % of at least one alpha-silane-terminated organic polymer;
    b) 0 wt % to 80 wt % of at least one silicone resin;
    c) 0.1 wt % to 5 wt % of at least one thermal accelerator, wherein the at least one thermal accelerator is a salt of a bicyclic tertiary amine of the following formula (II):

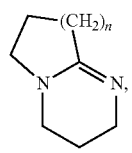

(II)

in which n is an integer from 1 to 3;
    d) 0.001 wt % to 5 wt % of at least one low molecular weight silane which has a primary or secondary amino group or a blocked amino group which hydrolyzes to the primary or secondary amino group, wherein the low molecular weight silane has a molecular weight in the range from 100 to 500 g/mol; and
    e) 0 wt % to 85 wt % of at least one filler.

2. The reactive one-component adhesive composition as claimed in claim 1, wherein the at least one alpha-silane-terminated organic polymer has the formula (I)

$$Y-[(CR^{1a}{}_2)-Si(R^{2a})_{b1}(OR^{3a})_{3-b1}]_x \quad (I),$$

wherein
Y is an x-valent polymer radical bonded via nitrogen, oxygen or sulfur,
$R^{2a}$ may be identical to or different from each other and is a monovalent, optionally substituted, SiC-bonded hydrocarbon radical,
$R^{1a}$ may be identical to or different from each other and is a hydrogen atom or a monovalent, optionally substituted hydrocarbon radical which may be attached to the carbon atom via nitrogen, phosphorus, oxygen, sulfur or carbonyl group,
$R^{3a}$ may be identical to or different from each other and is a hydrogen atom or a monovalent, optionally substituted hydrocarbon radical, x is an integer from 1 to 10, and
b1 may be identical to or different from each other and is 0, 1 or 2.

3. The reactive one-component adhesive composition as claimed in claim 1, wherein the at least one alpha-silane-terminated organic polymer has at least one end group of the formula  wherein
X is O or N(R);
each R independently of any other is hydrogen or a hydrocarbon radical having 1 to 20 carbon atoms;
$R^1$ and $R^2$ independently of one another are hydrogen or a hydrocarbon radical having 1 to 20 carbon atoms;
$R^3$ and $R^4$ independently of one another are a hydrocarbon radical having 1 to 20 carbon atoms;
a is 1 or 2; and
"*" marks the bond for the attachment to the polymer.

4. The reactive one-component adhesive composition as claimed in claim 1, wherein the at least one organic polymer is a polyoxyalkylene, a hydrocarbon polymer, a polyurethane, a polyester, a polyamide, a polysiloxane, a polyacrylate, a polymethacrylate or a polycarbonate.

5. The reactive one-component adhesive composition as claimed in claim 1, wherein the at least one organic polymer is a polyoxyalkylene.

6. The reactive one-component adhesive composition as claimed in claim 1, wherein the at least one silicone resin is a phenyl silicone resin.

7. The reactive one-component adhesive composition as claimed in claim 1, wherein
the salt of the bicyclic tertiary amine is a salt with an aliphatic monocarboxylic acid.

8. The reactive one-component adhesive composition as claimed in claim 7, wherein the salt is a salt of DBU.

9. The reactive one-component adhesive composition as claimed in claim 7, wherein the monocarboxylic acid is selected from the group consisting of methacrylic acid, crotonic acid and tiglic acid.

10. The reactive one-component adhesive composition as claimed in claim 7, wherein a mixing ratio is established such that a molar ratio of the bicyclic tertiary amine to the aliphatic monocarboxylic acid is at most 1.3.

11. The reactive one-component adhesive composition as claimed in claim 1, wherein the at least one thermal accelerator is a crotonic acid salt of DBU.

12. The reactive one-component adhesive composition as claimed in claim 1, wherein it contains, based on the total weight of the composition:
    a) 3 wt % to 90 wt % of the at least one alpha-silane-terminated organic polymer;
    b) 0 wt % to 50 wt % of the at least one silicone resin;
    c) 0.1 wt % to 5 wt % of the at least one thermal accelerator;
    d) 0.001 wt % to 5 wt % of the at least one low molecular weight silane which has a primary or secondary amino group or a blocked amino group which hydrolyzes to the primary or secondary amino group; and
    e) 0 wt % to 80 wt % of the at least one filler.

13. The reactive one-component adhesive composition as claimed in claim 1, wherein it contains, based on the total weight of the composition:
    a) 3 wt % to 50 wt % of the at least one alpha-silane-terminated organic polymer;
    b) 1 wt % to 30 wt % of the at least one silicone resin;
    c) 0.1 wt % to 2.5 wt % of the at least one thermal accelerator;

d) 0.01 wt % to 5 wt % of the at least one low molecular weight silane which has a primary or secondary amino group or a blocked amino group which hydrolyzes to the primary or secondary amino group; and
e) 10 wt % to 80 wt % of the at least one filler.

14. The reactive one-component adhesive composition as claimed in claim 1, wherein it contains, based on the total weight of the composition:
a) 5 wt % to 25 wt % of the at least one alpha-silane-terminated organic polymer;
b) 5 wt % to 20 wt % of the at least one silicone resin;
c) 0.1 wt % to 1 wt % of the at least one thermal accelerator;
d) 0.1 wt % to 4 wt % of the at least one low molecular weight silane which has a primary or secondary amino group or a blocked amino group which hydrolyzes to the primary or secondary amino group; and
e) 30 wt % to 80 wt % of the at least one filler.

15. The reactive one-component adhesive composition as claimed in claim 1, wherein it contains, based on the total weight of the composition:
a) 15 wt % to 25 wt % of the at least one alpha-silane-terminated organic polymer;
b) 10 wt % to 12 wt % of the at least one silicone resin;
c) 0.2 wt % to 0.5 wt % of the at least one thermal accelerator;
d) 1 wt % to 3 wt % of the at least one low molecular weight silane which has a primary or secondary amino group or a blocked amino group which hydrolyzes to the primary or secondary amino group; and
e) 59.5 wt % to 73.8 wt % of the at least one filler.

16. A bonded substrate system composed of two substrates, where the two substrates have a common adhesive area via which the two substrates are bonded using a thermally cured adhesive composition as claimed in claim 1.

17. A method for bonding two substrates, containing the steps of
(a) applying a reactive one-component adhesive composition as claimed in claim 1 to a first substrate, to give an adhesive area,
(b) contacting a second substrate with the adhesive area from step (a), and
(c) thermally curing the adhesive composition.

18. The method for bonding two substrates of claim 17, wherein the adhesive composition is thermally cured at a temperature of at least 50° C.

* * * * *